UNITED STATES PATENT OFFICE.

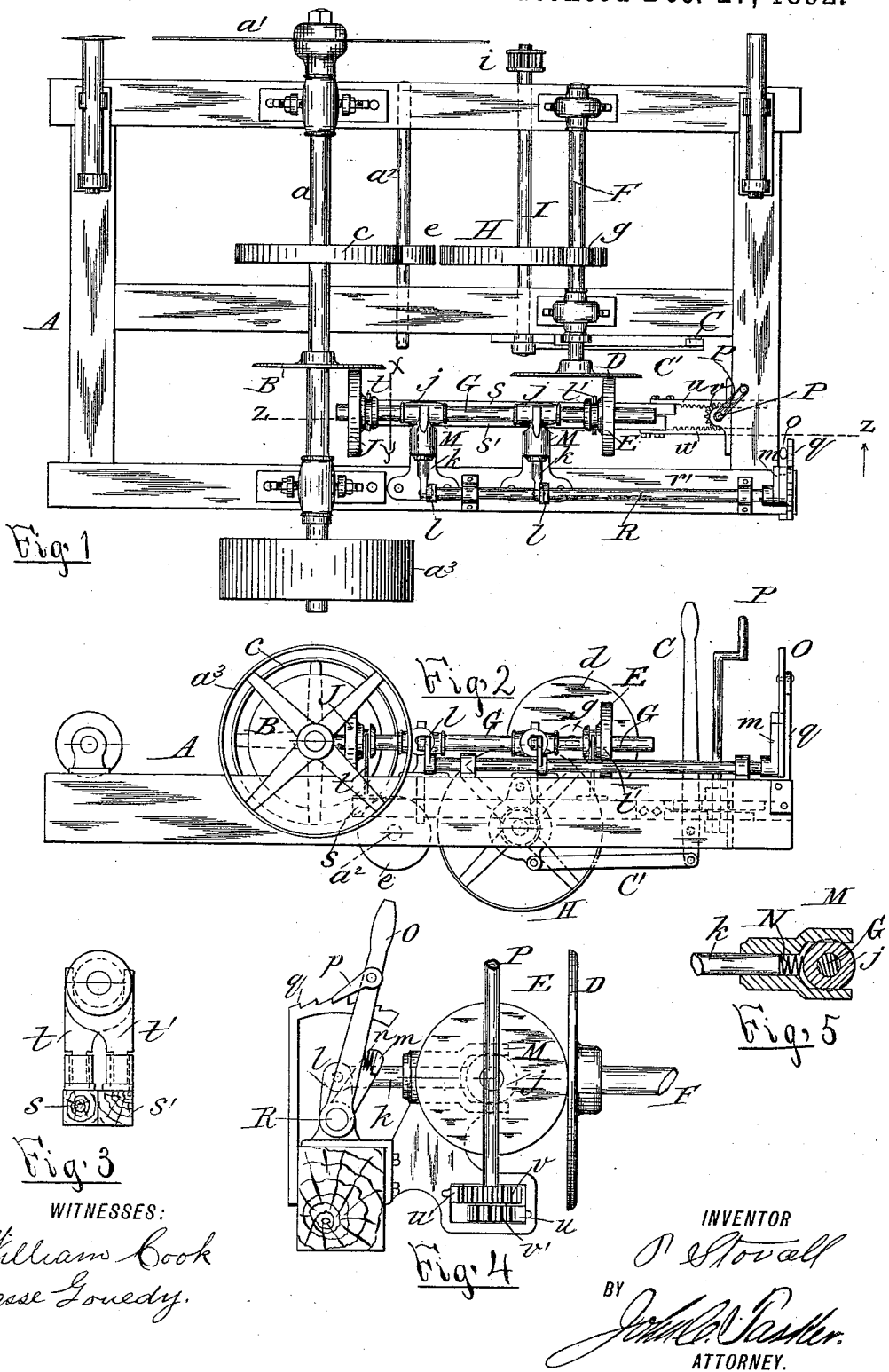

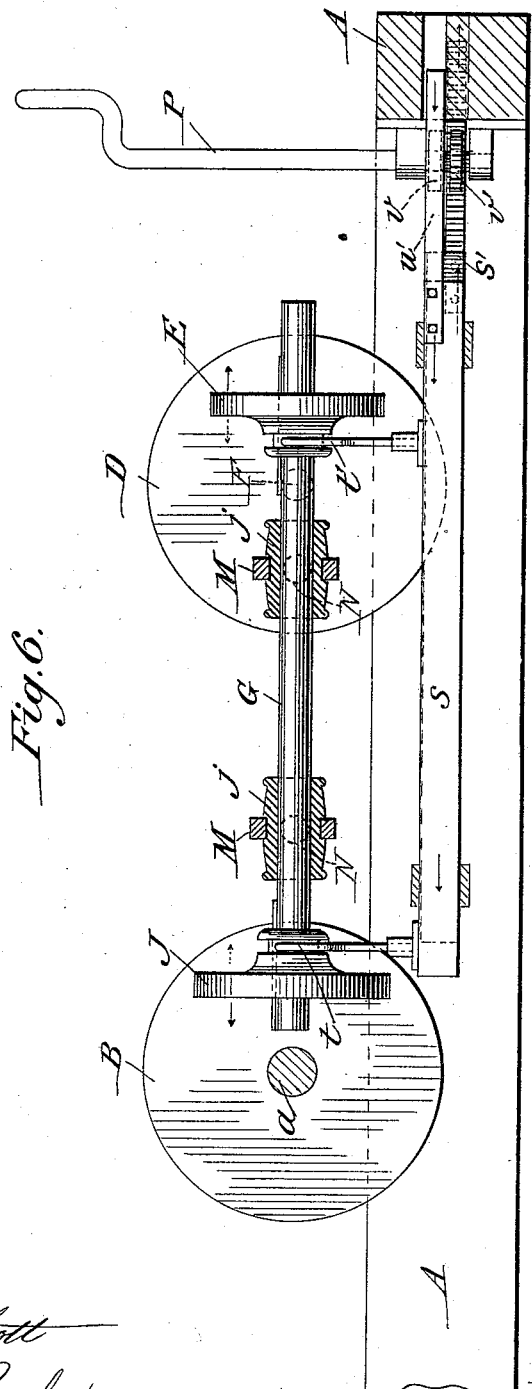

PHILIP STOVALL, OF ATLANTA, GEORGIA, ASSIGNOR OF ONE-HALF TO JOHN O. PERKINS, NELSON W. PERKINS, AND SHADRICK F. PERKINS, OF SAME PLACE.

VARIABLE FRICTION-FEED FOR SAWMILLS.

SPECIFICATION forming part of Letters Patent No. 488,618, dated December 27, 1892.

Application filed January 29, 1891. Serial No. 379,567. (No model.)

*To all whom it may concern:*

Be it known that I, PHILIP STOVALL, a citizen of the United States, residing at Atlanta, in the county of Fulton and State of Georgia, have invented certain new and useful Improvements in Variable Friction-Feeds for Sawmills; and I do hereby declare the following to be a full, clear, and exact description of the invention, such as will enable others skilled in the art to which it appertains to make and use the same.

This invention relates to an improvement in variable friction feed devices for saw mills, the object being to simplify and perfect the construction of the mechanism for providing a changeable feed, and it consists in the construction, arrangement and combination of parts, substantially as will be hereinafter described and claimed.

In the accompanying drawings illustrating my invention: Figure 1 is a top plan view of my improved feeding mechanism for actuating a saw mill carriage. Fig. 2 is a side elevation of the same. Figs. 3, 4 and 5 represent details of the construction of several of the parts of the mechanism of my present invention. Fig. 6 is an enlarged detail side elevation of the friction wheels and their shaft, together with the disks against which they operate and the mechanism for shifting the said wheels.

Similar letters of reference designate corresponding parts throughout all the different figures of the drawings.

A, denotes the main framework which may obviously be of any suitable and desirable construction.

$a$ indicates the saw mandrel or arbor whereon is the saw $a'$, as shown, and also the belt pulley $a^3$, said mandrel or arbor being held in suitable bearings on the main frame A. The disk B and also the friction wheel $c$ are secured fast to the arbor $a$. Parallel to the arbor $a$ is the shaft I, mounted in suitable bearings so as to be capable of swinging at one end, said shaft being made to revolve in either direction, as desired, and carrying a small pinion $i$, which meshes with a rack on the saw mill carriage in the usual manner for the purpose of moving the latter back and forth, (the carriage not being shown in the drawings as it is not thought to be necessary) and carrying also the friction wheel H fast thereto.

The lever C, pivoted to the main frame—see Fig. 2—and connecting with the swinging bearing of shaft I, by means of the link $C'$, is employed to shift the shaft I, in reversing the motion of the carriage.

Parallel and adjacent to the adjustable shaft I, is a shaft F, carried in suitable bearings and having secured to it a disk D and a friction wheel $g$, the latter being in contact with the friction wheel H when the carriage is moving forward. Between the arbor $a$ and the shaft I is an idler shaft $a^2$, having thereon a friction pulley $e$ which is opposite to wheel H and in constant contact with the friction wheel $c$ secured to the arbor. It will thus be seen that by shifting the shaft, the friction-wheel H, can in the usual way, be thrown into contact with either the friction wheel $e$ or the friction wheel $g$, and the carriage allowed to move backward or forward.

G represents a horizontal shaft located at right angles to the saw arbor and to the other shafts which have just been referred to. On it are the two friction wheels J and E, which are keyed or feathered to the shaft and are free to slide horizontally. The hub of each of these wheels J and E is provided with an annular groove. The wheel J has its periphery in contact with the disk B. The wheel E has its periphery in contact with the disk D. The annular groove on the hub of wheel J, receives an embracing fork or yoke $t$, the lower end of which is rigidly connected to a horizontal bar $s$, that is arranged to slide freely in a horizontal line. The annular groove on the hub of wheel E receives an embracing fork or yoke $t'$, the lower end of which is rigidly connected to a horizontal bar $s'$, parallel to and alongside of the bar $s$, and suitably arranged to slide horizontally. Evidently the sliding of bar $s$, would move fork $t$, and thus shift the position of wheel J so that its periphery would act against the surface of the disk B at a point nearer to or farther away from the center thereof, and likewise the sliding of bar $s'$, would move the fork $t'$ and consequently change the position of wheel E so that its periphery would act against the surface of the disk D at a point nearer to or farther from the center thereof, and therefore the speed of the different parts would vary accordingly. The bar $s$ is provided with a rack $u$, fastened to the end thereof, and the bar $s'$ with a rack $u'$, fastened to its end, see Fig. 1. These racks $u$ and $u'$ are engaged by the pinions $v$ and $v'$—see Fig. 4—on the upright shaft P, at the upper end of which is a hand crank. It will be manifest at a glance that when the crank is manipulated and the shaft P, revolved, the bars $s$ and $s'$, will move in opposite directions which will move the wheels J and E in opposite directions. The effect of this upon the feed will be clear from a word of explanation. Suppose for instance, the crank be rotated in one direction, the result of which may be to move the wheel J toward the periphery of the disk B, on which it acts and thus farther way from the center of said disk. The change in the relative position of wheel J and disk B, will increase the speed of the shaft G. But the same movement which has shifted the wheel J nearer to the periphery of disk B, has placed the wheel E nearer to the center of the disk D, whereby the speed of shaft F is increased, and so that there is a double acceleration of motion between the saw arbor $a$ and the feed carriage. A contrary or reverse rotation of the crank shaft P will manifestly operate to produce a slower motion of the parts and a diminution of the feed.

The shaft G is mounted in bearings $j\ j$, (see Fig. 2 and the detail Fig. 5) which are carried by supports M in which the bearings are free to slide as shown in Fig. 5. These supports M have tubular sockets which receive rods $k$. Between the inner ends of the rods $k$ and the bearings $j$, are arranged springs N which exert a constant pressure upon the bearings $j$ and thus keep the friction wheels J and E in close contact with the adjacent disks. At the ends of the rods $k$, are crank arms $l$, hinged thereto—see Fig. 4—which are rigidly fastened to the rock-shaft R. A lever O is mounted loosely upon the shaft R. Adjacent thereto and with a part thereof projecting behind lever O is an arm or crank $m$, fast on the shaft R. A spring $n$ is interposed between the arm $m$ and lever O, and the lever O is provided with a pawl or dog $p$, that engages the teeth of a rack or segment $q$. By pressing on the lever O, the force will be exerted through the spring $n$, upon arm $m$ and thus upon the rock shaft R to rock the same, vibrating the arms $l$ and pressing the rods $k$ inwardly so that they will act upon springs N, and keep shaft G so located that its wheels J and E, may preserve their contact at all times with the disks against which they bear.

Having thus described my invention, what I claim as new and desire to secure by Letters-Patent, is:—

1. The combination of a saw arbor having a disk thereon, a parallel shaft having a disk thereon and a friction wheel, another parallel shaft mounted in suitable bearings so as to be capable of swinging at one end and having a pinion which actuates the saw carriage and also having a friction wheel, the two friction wheels in contact with the disks respectively, the shaft on which said wheels are mounted, the sliding bars carrying yokes or forks that engage the hubs of the said wheels, said bars having racks engaged by pinions on a crank shaft and the horizontal crank shaft whose cranks are pivoted to rods between the ends of which and the friction wheel shaft bearings, are springs, together with the leverage devices for rocking the latter shaft and thus causing the friction wheels to bear with a constant, even pressure upon their adjacent disks, substantially as described.

2. In combination with the two adjustable friction wheels and their shaft, the bearings for said shaft carried movably within supporting arms, the rods entering said arms, the springs interposed between the ends of said rods and the bearings, the rocking crank shaft whose cranks are pivoted to the outer ends of said rods, the loose lever on said shaft having a pawl engaging the ratchet and the rigid arms likewise on the shaft adjacent to the lever, together with the spring interposed between said arm and the lever, the saw arbor having the disk thereon, a parallel shaft having a disk thereon and a friction wheel and another parallel shaft mounted adjustably and provided with a pinion which actuates the saw carriage, said latter shaft being geared to the other shafts, substantially as described.

In testimony whereof I affix my signature in presence of two witnesses.

PHILIP STOVALL.

Witnesses:
P. F. SMITH,
PAUL CAREY.